Oct. 22, 1929.   T. ROBINSON   1,732,281
METHOD OF MAKING PLASTIC COMPOUNDS
Filed June 18, 1929
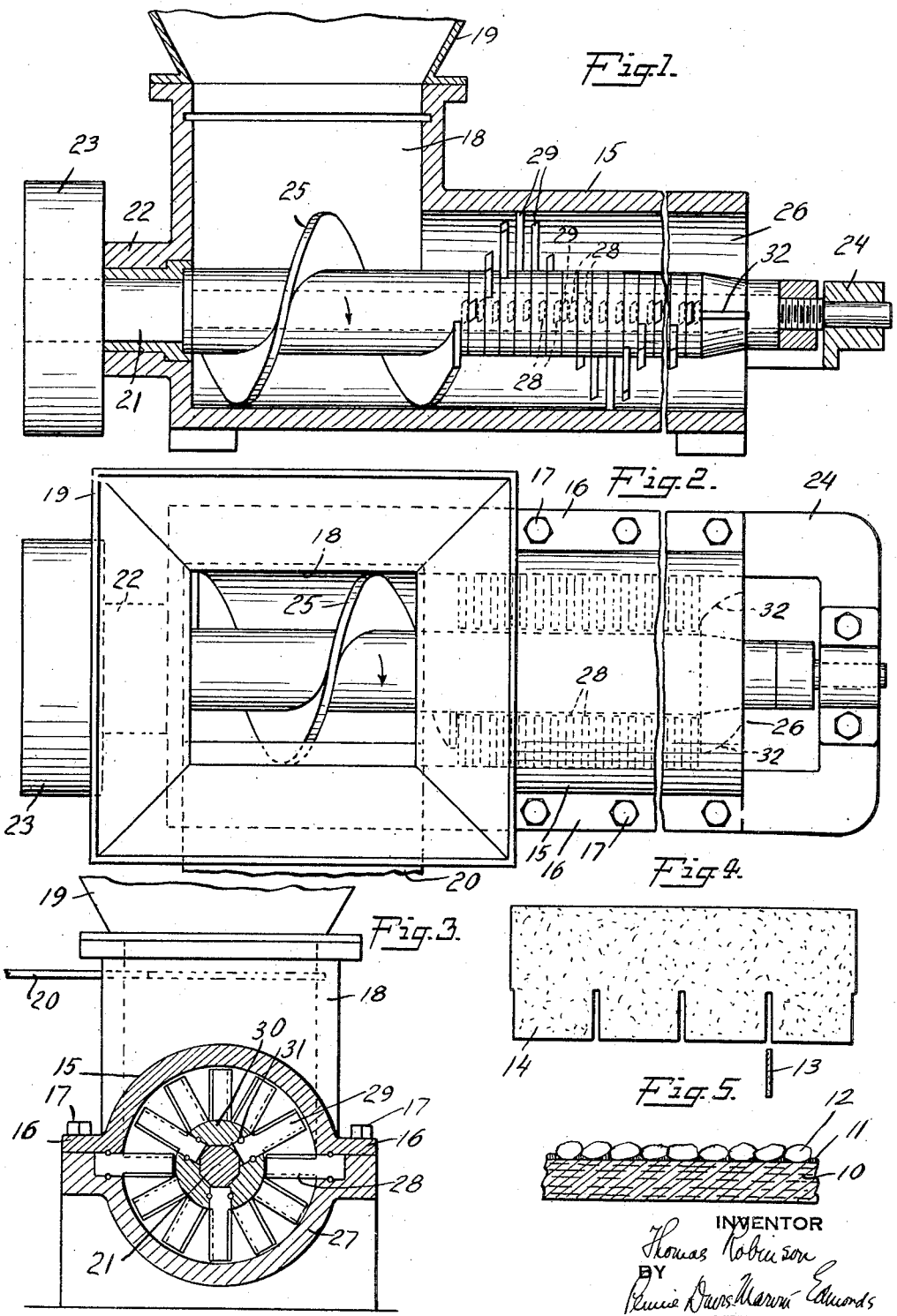

Patented Oct. 22, 1929

1,732,281

UNITED STATES PATENT OFFICE

THOMAS ROBINSON, OF NEW YORK, N. Y., ASSIGNOR TO LANCASTER ASPHALT, INC., OF NEW YORK, N. Y., A CORPORATION OF DELAWARE

METHOD OF MAKING PLASTIC COMPOUNDS

Application filed June 18, 1929. Serial No. 371,947.

This invention is concerned with the recovery and utilization of waste products of the asphalt roofing industry. More particularly, the invention has to do with a method of utilizing such waste for the production of a plastic material which finds many useful applications, some of which will presently be referred to.

In the manufacture of asphalt roofing, the customary method used involves saturating a web of roofing felt with asphalt of a relatively low melt point, applying a coating of a higher melt point asphalt to one face of the felt, embedding grit surfacing in the coating, and after cooling the saturated and coated felt, cutting it into the desired units. Such units ordinarily take the form of strip shingles, which consist of a rectangular piece of prepared felt subdivided along one edge to have the appearance of individual shingles by the removal of small portions of rectangular or other shapes. These cut-outs represent waste and up to the present have commonly been thrown away because no satisfactory method or apparatus has ever been developed, so far as I am aware, by which they could be transformed into a useful product.

In the average roofing factory, the cut-out waste represents a very substantial loss of felt, asphalt, and grit and this loss is considerably augmented by imperfect shingles resulting either from defects in the machinery or from injury in handling. It is recognized throughout the industry that the cutting of asphalt impregnated and coated felt provided with a surfacing of grit is an operation of extreme difficulty and even with the best technique and equipment, the waste is high and adds greatly to the cost of the finished product.

I have found, however, that this waste, if properly processed, may be made at low cost into a plastic material suitable for numerous molded articles, such as battery boxes and the like and particularly adapted as a body material in roofing elements of the type illustrated and described in my Patent No. 1,698,242, issued January 8, 1929. The felt, saturating and coating asphalt, and the grit are present in ordinary roofing waste in proportions generally suitable for the production of a plastic material which may be readily molded and shaped and which is stiff and rigid upon setting.

The method I employ involves feeding the waste material in relatively small pieces into an operating zone through which the material is steadily advanced. The material is subjected to a series of shearing operations in this zone and between successive shearing operations the material is agitated and mixed. The waste introduced in the form of small individual pieces rapidly becomes agglomerated into a plastic mass and the temperature of the material rises by reason of the operations performed on it, so that the asphalt softens and a thorough mixing can be effected. The waste material being treated is confined within the operating zone so that the heat generated therein is not dissipated to any substantial extent and the product discharged from the zone is a soft plastic mass through which the felt fibres and grit are widely distributed. This material is suitable for immediate use for molding purposes.

For a better understanding of the invention, reference may be made to the accompanying drawings, in which, Fig. 1 is a view in longitudinal section of an apparatus by which the method of this invention may be practiced;

Fig. 2 is a plan view of the said apparatus;

Fig. 3 is a transverse section of the apparatus;

Fig. 4 is a plan view of a strip shingle showing the waste produced in cutting it; and Fig. 5 is a sectional view on an enlarged scale through grit surfaced roofing felt.

In Fig. 5 of the drawings, there is illustrated a piece of roofing material made up of a strip or web 10 of felt saturated with asphalt and having on one face a coating 11 of asphalt of a higher melt point. In the asphalt coating is embedded grit surfacing 12 in the form of slate or similar mineral products of that nature. In the manufacture of shingles the web is saturated, coated, and surfaced, and then after cooling is advanced to cutting devices which form shingles therefrom. Usually the felt is cut into strip shingles, such as that illustrated in Fig. 4. The shingle there shown is of the four-unit size, the individual units being separated by the removal of cut-outs 13 along one edge. These cut-outs may be of the rectangular shape illustrated, in which case the tabs 14 separated by the cut-outs have square butt edges, or the tabs may be formed with the corners cut off, in which event the cut-outs 13 have an irregular shape appropriate for the purpose. In the manufacture of such shingles, the cut-outs are waste and the loss of felt, grit, and asphalt forms a substantial item of the cost of the finished material. This loss is increased by reason of the production of imperfect shingles, these imperfections being due to poor cutting, tearing of the felt, injury in handling, or the like. Heretofore such waste products have been wholly discarded and they not only represent a substantial loss but also present difficulties in their disposal.

While attempts have been made to utilize this waste material, no method or apparatus has been developed heretofore so far as I am aware by means of which the waste can be converted into a useful product. The difficulties involved in treating the waste arise from the fact that it is made up of felt, asphalt, and grit, a combination which is extremely difficult to handle since the asphalt becomes soft and gummy in any operation performed upon it.

I have found, however, that this waste material may be transformed into a plastic mass suitable for molding operations by subjecting the material to a succession of shearing operations, alternating with agitating and mixing and for carrying out these operations, I prefer to employ the apparatus illustrated in Figs. 1 to 3, inclusive. In this apparatus, there is a cylindrical metal barrel 15 made preferably in two halves with each half provided with longitudinal edge flanges 16 so that the two halves may be secured together by bolts 17. The upper portion of the barrel is provided at one end with a feed opening 18 on the top of which is mounted a hopper 19 of any suitable construction. The feed from the hopper through the feed opening into the barrel is controlled by a sliding gate 20 movably mounted in suitable slots in the wall of the feed opening and controlling flow of material in the usual manner.

Mounted within the barrel is a shaft 21 supported in a suitable bearing 22 at the feed end of the device, the shaft being provided with a drive pulley 23 on the end which projects from the barrel at the feed end. The shaft extends through the barrel and at the delivery end thereof the shaft is mounted in a bearing in a yoke 24 secured to one of the barrel members. A conveyor screw 25 is mounted on part of the shaft beneath the feed opening, this screw receiving material delivered into the barrel and advancing it toward the discharge end 26 thereof.

Mounted in slots in opposite sides of the lower member 27 of the barrel are two series of stationary knife blades 28, the blades being spaced apart and extending radially toward the shaft 21. The shaft carries a plurality of radial knife blades 29, these knives being arranged preferably in a helical series with adjacent blades separated by spacing collars 30. These collars have slots in which the blades 29 are mounted and held in position by keys 31. The spacing collars have a thickness substantially the same as the thickness of the stationary knife blades 28 and as the movable knives 29 are carried around by the rotation of the shaft, the knives 29 cooperate with the stationary knives 28 so that any material between the knife edges is sheared.

In the operation of the device, the cut-outs or discarded shingles, cut up to relatively small size, are dumped into the hopper and pass into the feed end of the barrel where the material is picked up by the conveyor screw 25 and moved along the barrel to be acted on by the knife blades. The material is picked up by the blades 29 in their movement and sheared by cooperation of the movable and stationary blades. Such material as is carried between adjacent stationary knives passes over the top of the shaft and is sheared between the movable and stationary knives on the other side of the shaft. The material then passes down around the bottom of the barrel and upward again. In its movement the material is mixed and agitated by the moving knives and it moves slowly lengthwise of the device toward the open discharge end of the barrel.

The waste products enter the barrel at ordinary temperature but in the succession of shearing operations to which the material is subjected, it soon becomes soft and plastic, so that it agglomerates into a relatively stiff mass. The asphalt in the mass becomes more fluid as the shearing operations continue, the mass losing little heat since the walls of the barrel are heavy and heat is radiated therefrom slowly. After being subjected to the alternate shearing and agitating operations, the plastic mass which has repeatedly been cut up by the shearing action of the knives and then reunited by the agitating action, is discharged in masses of considerable size from the discharge end of the barrel, the discharge being assisted by blades 32 on the end of the shaft beyond the knife blades 29. The material at the time of its discharge has a relatively high temperature which may be as high as 265° F. The temperature of the product discharged will depend on the character of the waste product used, since some products offer greater resistance to the treatment than others and consequently there is greater friction in the apparatus and higher temperatures result.

The waste products employed have a somewhat variable analysis but in a waste from the manufacture of light weight roofing made of what is termed "25 lb. felt", there may be present 15% of felt by weight, 29% of grit, and 56% of asphalt. In a 52 lb. felt the slate may amount to 26%, the felt 13%, and the asphalt 61%. The asphalt ordinarily employed for saturating such roofing has a melt point of 160°, while the coating asphalt is relatively harder and has a melt point of 220°.

In feeding the material to the apparatus, it is important to control the rate of feed so that the apparatus does not clog and the pieces should also be relatively small. The cut-outs from the manufacture of multiple shingles are of suitable size for feeding but where rejected shingles are employed, these shingles must be reduced to pieces having a size not substantially different from the cut-outs. This can be readily done manually by tearing the material.

The plastic product produced by this treatment contains a large proportion of asphalt through which the fibrous material and grit is thoroughly distributed. The felt is broken up by the shearing action of the knives so that the fibres thereof are widely distributed through the asphalt, little or no fibres remaining in their original felted condition. The grit is pulverized to some extent by the action of the knives, although particles of the original size are found to remain in the product discharging from the apparatus. The grit and felt fibres present in the plastic material are advantageous in that they render the plastic mass stiff and relatively rigid when the material sets after being molded.

The plastic mixture discharged from the apparatus has a relatively high temperature and may be used at once and without further treatment for molding numerous articles, such as battery boxes and other vessels of that character. This material is also useful for the core of the roofing element disclosed in my Patent No. 1,698,242 above mentioned. For the latter purpose, the plastic mass is delivered at once to molding drums where it is incorporated between jacket sheets in the manner described in the patent.

What I claim is:

1. A method of producing plastic material from waste products of the asphalt roofing industry which comprises subjecting the waste material in small pieces to a succession of shearing operations and agitating and mixing the material in alternation with the shearing.

2. A method of producing plastic material from waste products of the asphalt roofing industry which comprises subjecting the waste material to a succession of shearing operations and mixing the material in alternation with the shearing, the temperature of the material being raised to a substantial amount during the shearing and mixing.

3. A method of producing plastic material from waste products of the asphalt roofing industry which comprises subjecting the waste material in small pieces to a succession of shearing operations, agitating and mixing the material between successive shearing operations, and simultaneously raising the temperature of the material as the various operations proceed.

4. A method of producing plastic material from waste products of the roofing industry which products are composed of felt saturated and coated with asphalt and surfaced with grit which comprises advancing said products in the form of relatively small pieces, subjecting portions of the advancing mass to shearing operations one after another, and simultaneously mixing and agitating such portions of the mass as are not being sheared.

5. A method of producing plastic material from waste from the asphalt roofing industry which comprises advancing the waste through an operating zone and feeding waste in the form of small pieces to the zone as rapidly as the plastic material is discharged therefrom, and, during the advance of the material through the zone, subjecting the material, at spaced points to successive shearing operations and agitating and mixing the material between such shearing operations.

In testimony whereof I affix my signature.

THOMAS ROBINSON.